US010296898B2

(12) United States Patent
Singh et al.

(10) Patent No.: US 10,296,898 B2
(45) Date of Patent: May 21, 2019

(54) SYSTEM FOR PACKAGING, PROCESSING, ACTIVATING, AND DEACTIVATING MULTIPLE INDIVIDUAL TRANSACTION CARDS AS A SINGULAR UNIT

(71) Applicant: Blackhawk Network, Inc., Pleasanton, CA (US)

(72) Inventors: Lalit Singh, Fremont, CA (US); Sanjay Shirsekar, San Ramon, CA (US)

(73) Assignee: BLACKHAWK NETWORK, INC., Pleasanton, CA (US)

(*) Notice: Subject to any disclaimer, the term of this patent is extended or adjusted under 35 U.S.C. 154(b) by 14 days.

(21) Appl. No.: 15/240,590

(22) Filed: Aug. 18, 2016

(65) Prior Publication Data
US 2016/0358160 A1    Dec. 8, 2016

Related U.S. Application Data

(60) Continuation of application No. 14/810,300, filed on Jul. 27, 2015, now Pat. No. 9,449,315, which is a
(Continued)

(51) Int. Cl.
*G06Q 20/34* (2012.01)
*G09F 1/02* (2006.01)
(Continued)

(52) U.S. Cl.
CPC .......... *G06Q 20/354* (2013.01); *B32B 27/08* (2013.01); *B32B 27/308* (2013.01); *B32B 27/40* (2013.01);
(Continued)

(58) Field of Classification Search
USPC .............................................. 235/380, 382.5
See application file for complete search history.

(56) References Cited

U.S. PATENT DOCUMENTS 5,578,808 A    11/1996   Taylor
5,918,909 A     7/1999   Fiala et al.
(Continued)

FOREIGN PATENT DOCUMENTS

EP    2082353 A2    7/2009
JP    11003408 A    1/1999
(Continued)

OTHER PUBLICATIONS

Filing receipt and specification for provisional patent application entitled "System for Packaging, Processing, Activating, and Deactivating Multiple Individual Transaction Cards as a Singular Unit," by Lalit Singh, et al., filed Nov. 13, 2006 as U.S. Appl. No. 60/865,571.

(Continued)

*Primary Examiner* — Rafferty Kelly
(74) *Attorney, Agent, or Firm* — Wick Phillips Gould & Martin LLP; Jerry C. Harris, Jr.

(57) ABSTRACT

A transaction card processing and activation system comprising the identification of a unique identifier corresponding to an aggregate of transaction cards of affiliated or non-affiliated card issuers and the activation of each transaction card corresponding to the unique identifier of the aggregate irrespective of the number, types, or card issuers of the transaction cards. Additionally, the present invention allows a point of sale entity to initiate the activation of each of the multiple, disparate transaction cards in the aggregate by merely processing the unique identifier associated with the aggregate.

7 Claims, 5 Drawing Sheets

Related U.S. Application Data continuation of application No. 12/778,645, filed on May 12, 2010, now Pat. No. 9,092,764, which is a division of application No. 11/560,380, filed on Nov. 16, 2006, now Pat. No. 7,740,170.

(60) Provisional application No. 60/865,571, filed on Nov. 13, 2006.

(51) Int. Cl.

| | | |
|---|---|---|
| *G06Q 20/20* | (2012.01) | |
| *G06Q 20/36* | (2012.01) | |
| *G06Q 20/38* | (2012.01) | |
| *G06Q 30/06* | (2012.01) | |
| *G07F 7/02* | (2006.01) | |
| *B32B 27/08* | (2006.01) | |
| *B32B 27/30* | (2006.01) | |
| *B32B 27/40* | (2006.01) | |
| *C08G 18/38* | (2006.01) | |
| *C08G 18/76* | (2006.01) | |
| *C08G 18/83* | (2006.01) | |
| *C08L 33/04* | (2006.01) | |
| *C09D 175/04* | (2006.01) | |

(52) U.S. Cl.
CPC ..... *C08G 18/3876* (2013.01); *C08G 18/7664* (2013.01); *C08G 18/83* (2013.01); *C08L 33/04* (2013.01); *C09D 175/04* (2013.01); *G06Q 20/20* (2013.01); *G06Q 20/204* (2013.01); *G06Q 20/342* (2013.01); *G06Q 20/3572* (2013.01); *G06Q 20/367* (2013.01); *G06Q 20/3672* (2013.01); *G06Q 20/3674* (2013.01); *G06Q 20/3821* (2013.01); *G06Q 30/06* (2013.01); *G07F 7/025* (2013.01); *G09F 1/02* (2013.01)

(56) References Cited

U.S. PATENT DOCUMENTS

| | | |
|---|---|---|
| 6,328,341 B2 | 12/2001 | Klure |
| 6,829,596 B1 | 12/2004 | Frazee |
| 7,191,939 B2 | 3/2007 | Beck et al. |
| 7,740,170 B2 | 6/2010 | Singh et al. |
| 7,822,640 B2 | 10/2010 | Arthur et al. |
| 8,430,298 B2 | 4/2013 | Martinez et al. |
| 8,888,001 B2 | 11/2014 | Singh et al. |
| 9,092,764 B2 | 7/2015 | Singh et al. |
| 9,449,315 B2 | 9/2016 | Singh et al. |
| 2001/0022446 A1 | 9/2001 | Klure |
| 2002/0040346 A1 | 4/2002 | Kwan |
| 2004/0153410 A1 | 8/2004 | Nootebos et al. |
| 2005/0199706 A1* | 9/2005 | Beck ............... G06Q 20/105 235/380 |
| 2006/0261154 A1* | 11/2006 | Arthur ............... G06Q 20/20 235/380 |

FOREIGN PATENT DOCUMENTS

| | | |
|---|---|---|
| JP | 2001325436 A | 11/2001 |
| JP | 2002083145 A | 3/2002 |
| JP | 2002515994 A | 5/2002 |
| JP | 2003251967 A | 9/2003 |
| JP | 2003256751 A | 9/2003 |
| JP | 3120520 U | 4/2006 |
| JP | 2006236130 A | 9/2006 |
| WO | 02054170 A2 | 7/2002 |
| WO | 03008202 A1 | 1/2003 |
| WO | 2008063930 A2 | 5/2008 |
| WO | 2008063930 A3 | 5/2008 |

OTHER PUBLICATIONS

Foreign communication from a related counterpart application—International Search Report and Written Opinion, PCT/US07/84318 dated Apr. 28, 2008, 9 pages.

Foreign communication from a related counterpart application—International Preliminary Report on Patentability, PCT/US07/84318 dated May 19, 2009, 7 pages.

Foreign communication from a related counterpart application—Australian Examination Report, AU 2007323923 dated Jun. 20, 2011, 2 pages.

Foreign communication from a related counterpart application—Supplementary European Search Report, EP 07864237.8 dated Mar. 6, 2012, 6 pages.

Foreign communication from a related counterpart application—Japanese Office Action with Translation, JP 2009-537286 dated Aug. 17, 2012, 6 pages.

Foreign communication from a related counterpart application—New Zealand Examination Report, NZ576994 dated Dec. 16, 2010, 2 pages.

Foreign communication from a related counterpart application—New Zealand Examination Report, NZ599746 dated May 10, 2012, 3 pages.

Foreign communication from a related counterpart application—Australian Examination Report, AU2013201650 dated Oct. 11, 2013, 3 pages.

Foreign communication from a related counterpart application—Japanese Office Action with Translation, JP 2009-537286 dated Sep. 2, 2014, 20 pages.

* cited by examiner

SYSTEM FOR PACKAGING, PROCESSING, ACTIVATING, AND DEACTIVATING MULTIPLE INDIVIDUAL TRANSACTION CARDS AS A SINGULAR UNIT

CROSS-REFERENCE TO RELATED APPLICATIONS

This application is a continuation application of U.S. patent application Ser. No. 14/810,300 filed Jul. 27, 2015, which is a continuation of U.S. patent application Ser. No. 12/778,645 filed May 12, 2010, now U.S. Pat. No. 9,092,764, which is divisional of U.S. patent application Ser. No. 11/560,380 filed Nov. 16, 2006, now U.S. Pat. No. 7,740,170, which claimed priority to U.S. Provisional Patent Application No. 60/865,571, filed on Nov. 13, 2006 and entitled "A System for Packaging, Processing, Activating, and Deactivating Multiple Individual Transaction Cards as a Singular Unit," both of which are hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention generally relates to a processing and activation system providing consumers with the ability to purchase transaction cards, i.e., gift cards, debit cards, and credit cards, of various affiliated or non-affiliated service providers in a singular prepackaged assembly.

BACKGROUND OF THE INVENTION

The market for transaction cards such as merchant gift cards continues to grow. Until now, consumers have had to separately purchase the cards of differing card issuers or purchase packages containing multiple cards from the same card issuer. The present disclosure addresses the shortcomings of present systems by providing consumers with the ability to purchase multiple cards from differing card issuers in a singular package assembly and providing point of sale entities with the ability to initiate the activation of each card in the package by merely processing the package assembly.

SUMMARY OF THE INVENTION

Disclosed herein is a package assembly and method for permitting the activation and deactivation of a plurality of individual transaction cards, such as merchandise cards or service cards of affiliated or non-affiliated card issuers, at a point of sale whereby the latency, e.g., the amount of time between interpretation of the package identifier 250 at the point of sale and activation or deactivation of the individual transaction cards secured by the package, of the transaction is independent of the number of individual transaction cards secured by the package. Further disclosed is a package assembly containing a plurality of transaction cards with each transaction card comprising a unique identification number. Further disclosed is an identifier on the package assembly encoded with information identifying the package assembly.

When the package identifier is interpreted at the point of sale, the data associated with the package assembly identifier, along with an activation or deactivation request, is communicated to a multicard transaction computer. Upon receipt of the package assembly activation or deactivation request, the multicard transaction computer retrieves pre-stored information from a database containing transaction card identifiers associated with specific package identifiers. Upon processing the request and information from the database, the multicard transaction computer initiates an activation or deactivation protocol. As part of the activation/deactivation protocol, the multicard transaction computer communicates with the individual card issuers' authorization systems to effectuate activation or deactivation of individual transaction cards. Subsequently, the multicard transaction computer communicates the activation or deactivation of the individual transaction cards to the point of sale. If the transaction cards are activated, the transaction cards may immediately be used to conduct transactions. If the transaction cards are deactivated, the packaged assembly can be restocked for later purchase and activation.

DETAILED DESCRIPTION OF THE PREFERRED EMBODIMENTS

Figure 1A:
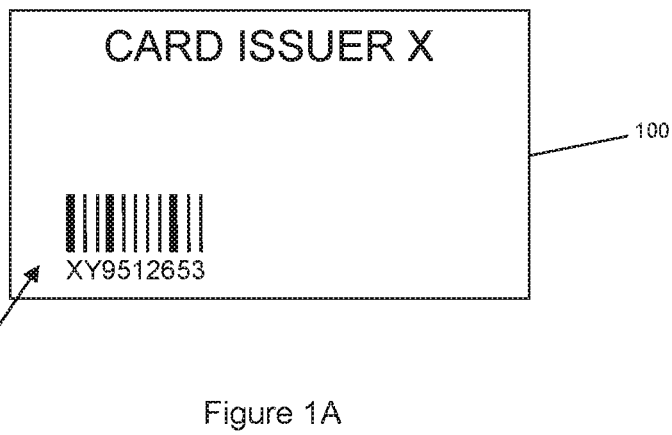
FIGS. 1A and 1B are front perspective views of representative individual transaction cards.
Figure 1B:
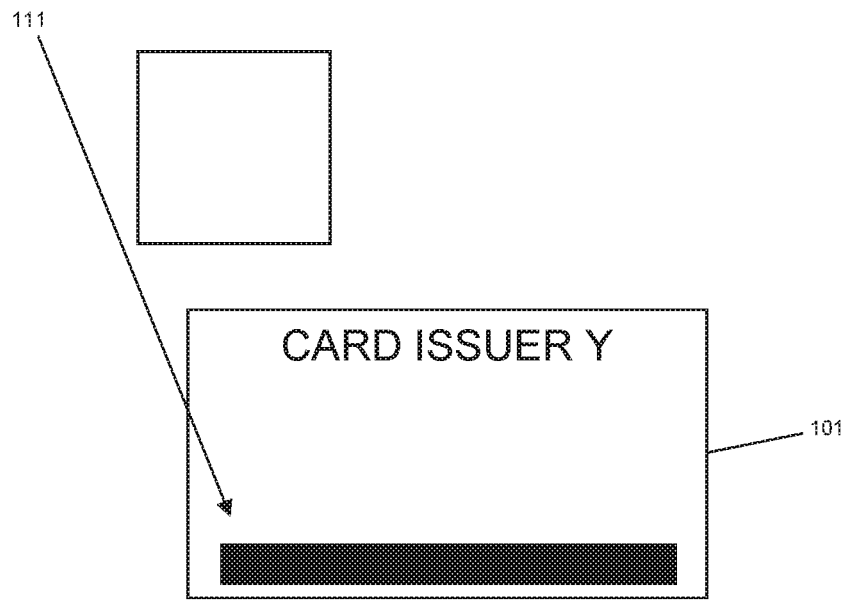
Figure 2A:
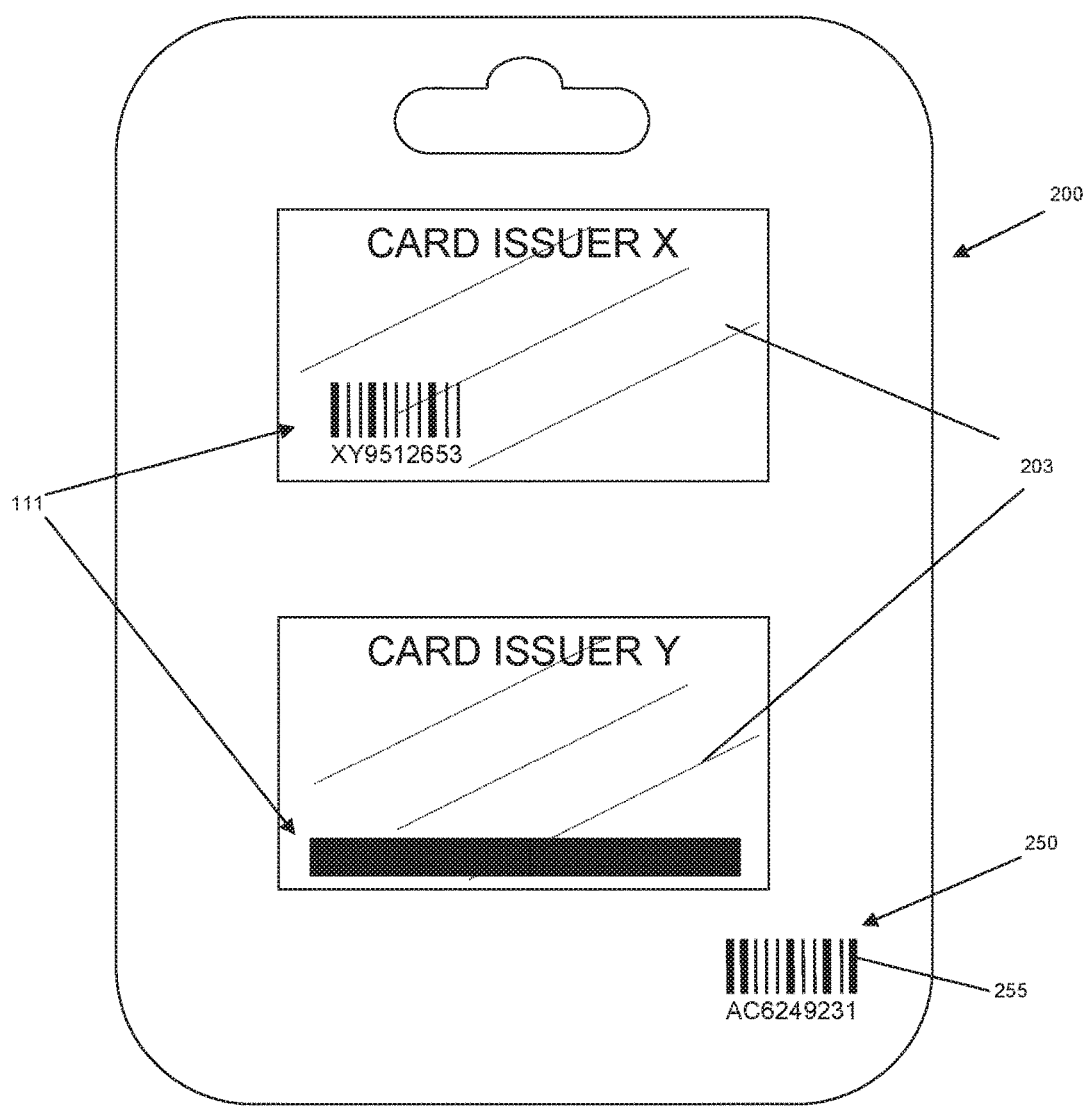
FIGS. 2A and 2B are front perspective views of package assemblies for securing multiple individual transaction cards.
Figure 2B:
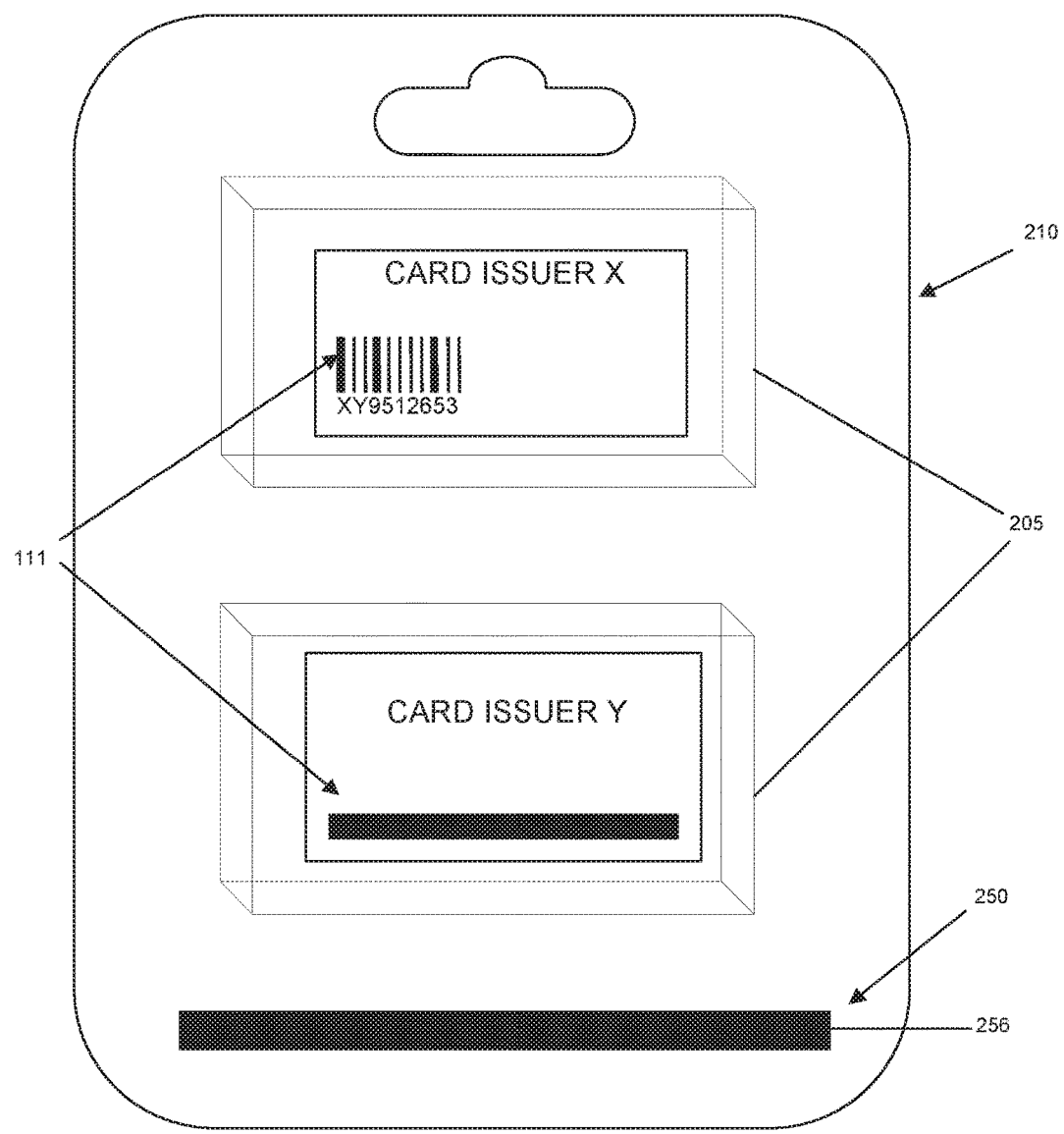

As used herein, transaction card refers to a card that may be used to transact business with a party willing to accept the card, for example as tender for a purchase. Examples of such cards include credit cards, debit cards, gift cards, telephone cards, loyalty cards, membership cards, ticket cards, entertainment cards, sports cards, prepaid cards, and the like. Typically, such cards are wallet-sized and made of plastic. In various embodiments, the transaction card may be a type of card such as a gift or prepaid card that requires activation at a point of sale. For example, a transaction card may be purchased and activated at a point of sale by a consumer and subsequently used by the consumer or another (e.g., the recipient of the card as a gift) to transact business.

Consumer use of transaction cards typically involves a card vendor, a redeeming merchant, and a card issuer. In various embodiments, the card vendor, redeeming merchant and card issuer may be the same, different, or related entities. The point of sale where transaction cards are purchased and activated may be referred to as the card vendor or simply vendor. An entity that will accept a transaction card for business transactions, for example as tender for a purchase, may be referred to as a redeeming merchant. An entity that provides the financial backing and/or payment processing accessed via the transaction card may be referred to as the card issuer or simply issuer.

Typically, the issuer is identified on the transaction card and associates a unique issuer account code with each transaction card. Card issuers include direct issuers of cards such as store-branded cards, and in some embodiments the card vendor may also be the card issuer and/or the redeeming merchant. Card issuers also include banks, financial institutions, and transaction processors such as VISA, Mastercard, American Express, etc., and cards issued by such institutions may be readily accepted by a number of redeeming merchants to conduct transactions such as purchases. In some instances, the redeeming merchant may be identified on the transaction card (for example, a retailer branded card such as Store X), and such cards may be sold at the same or different card vendor (e.g., card vendor is Store X or a different or unrelated Store Z). In such instances, the Store X branded transaction card may be issued by Store X, by Store Z, or by a third party such as bank or financial institution.

In an embodiment, a card vendor is able to offer customers the ability to purchase multiple transaction cards secured in a single package assembly, whereby the latency of the activation transaction is independent of the number of individual transaction cards secured by the package. FIGS. 1A, 1B, 2A and 2B depict transaction cards 100 and 101 and associated packages 200 and 210 in accordance with the present invention. For purposes of discussion, transaction cards 100 and 101 are to be considered issued from independent, non-affiliated card issuers. It is understood, however, that multiple cards from the same and/or affiliated card issuers could be packaged and activated in the same manner as the following description for transaction cards 100 and 101.

The transaction card 100 is fabricated from a suitable first material, such as plastic, paper, a plastic-coated paper, laminates, or combinations thereof. The transaction card 100 is typically made in a thickness range of from about 0.005 to about 0.040 inch. The transaction card 100 bears an identifier 111. The transaction card identifier 111 is unique to the transaction card and associates the transaction card to a unique account maintained by the card issuer. The transaction card identifier may be encoded in a bar code, a magnetic strip, a series of numerals, a series of letters, or a combination thereof. The transaction card 100 may also be fashioned with a personal identification number, or PIN, to be entered during the course of the transaction, that corresponds to the transaction card identifier 111 and allows access and/or use of the transaction card account. The PIN may be encoded in a bar code, a magnetic strip, a series of numeral, a series of letters, or a combination thereof. The PIN may be obscured from view by the packages 200 and 210, by an obscuring material such as a scratch-off strip or peel-off label, or combinations thereof. The transaction card 100 is made separate and apart from the packages 200 and 210.

Packages 200 and 210 are distinct and separate from the individual transaction cards. Packages 200 and 210 may be formed from paper, plastic, plastic-coated paper, laminate, or combinations thereof. For example, the package may be made of a 15 point coated one-side board stock, although it may be a laminated board or other laminate. Preferably, if the package secures transaction cards comprising PINs, the package backing material is opaque, to obscure the PINs on the transaction card 100, as described above. A transparent shrink wrap plastic film 203, applied using well-known methods, may be used to cover the transaction cards 100, 101 and to secure the transaction cards 100, 101 to package 200. In the alternative, a transparent plastic cover 205 with an appropriately sized, generally rigid, embossed area accommodating the transaction cards 100 and 101 may be incorporated, forming a structure commonly known as a "blister pack" 210. The packages 200 and 210 may be imprinted with decorations, advertising, coupons, instructions, or other information as will now be apparent to those skilled in the art. Packages 200 and 210 are presented for illustrative purposes only and are not intended to represent the every embodiment of packages capable of being formed to secure multiple individual transaction cards. For example, package assemblies could be constructed to secure 3, 4, 5, 6, 7, 8, 9, 10 or any plurality of cards, from any number of affiliated or non-affiliated card issuers. Additionally, package assemblies could be fashioned from any industry-accepted material with individual transaction cards secured in any industry-accepted manner. Furthermore, these packages could be formed or constructed in a plurality of shapes or presentations comprising a plurality of decorative, informational, promotional, or other information as would be apparent to those skilled in the art.

The package 200 and 210 bears an identifier 250. The package identifier 250 is unique to the package and is linked to the transaction cards, and more specifically, to the transaction card identifiers secured by the package. The package identifier may be encoded in a bar code, a magnetic strip, radio frequency identification (RFID) tags, microprocessors, microchips, a series of numerals, a series of letters, or a combination thereof. The package identifier 250 may be positioned anywhere on the package whereby it is capable of being interpreted by a point of sale interpretation component 301.

In an embodiment of the package identifier 250, the package 200 comprises a bar code 255 of conventional construction, such as a UPC code, positioned on the package 200 so that it can be scanned by well-known bar code reading equipment. Encoded in the bar code 255 on the package is a representation of the package identifier.

In another embodiment of the package identifier 250, the package 210 comprises a magnetic strip 256 of conventional construction, such as one deposited from a slurry, positioned on the package 210 so that it can be scanned in well-known magnetic strip reading equipment. A terminal such as a Tranz 380 made by Verifone is suitable in this application.

Encoded on the magnetic strip 256 on the package is a representation of the package identifier. For additional security, the package identifier may also be subjected to an encryption algorithm, many of which are well-known in the art, prior to encoding on the magnetic strip 256.

In other embodiments of the package identifier (not shown), radio frequency identification (RFID) tags, microprocessors, microchips may be placed on the package 200 and 210 to be interpreted by specifically configured devices.

In further embodiments, series of numerals, series of letters, or combinations thereof, may be placed on the package 200 and 210 to be read or interpreted by a human or a device, i.e. optical character recognition device, configured to interpret a series of shapes corresponding to the package identifier.

In an embodiment, a package assembly comprises at least three distinct identifiers, namely a vendor product identification code, the package identifier 250, and a combination vendor product identification and package identifier. The three identifiers may be encoded within bar codes, magnetic strips, electronic tags such as radio frequency identification (RFID) tags, microprocessors, microchips, series of numerals, series of letters, or combinations thereof. All three identifiers should be externally visible and/or readily accessible on the package assembly or component thereof for use at a point of sale to activate the package and the individual cards secured by the package. Having all three identifiers present and visible/readily accessible on the package assembly allows the package and individual transaction cards secured by the package to be activated by either a one-step or a two-step activation sequence. Embodiments described herein having at least three unique identifiers and thus being capable of either one-step or two-step activation are also referred to herein as hybrid embodiments or hybrid package assemblies.

In a two-step activation sequence, the first step comprises entering the vendor product identification code at a point of sale terminal such as a register at a check out lane, which performs a look-up to determine the identity of the product being purchased. For example, the first step may be performed at the point of sale terminal by scanning a UPC bar code, more specifically a 12 digit bar code also referred to as an EAN/UCC-12 or UPC-A, containing the vendor product identification code. A price is typically associated with the look-up and product identification. Such price may be fixed, for example incremental denominations such as a $25 card, $50 card, etc. or alternatively may be a variable amount requested by the customer. The second step comprises entering the package identifier 250 at the point of sale, which is then used to activate the package and the individual transaction cards secured by the package such that the individual transaction cards may be used to transact business with a redeeming merchant. For example, the second step may be performed by swiping a magnetic strip containing the package identifier 250, wherein package identifier 250 is interpreted from the magnetic strip and used to activate the individual transaction cards secured by the package. Alternatively, the second step may be performed by scanning a bar code containing the package identifier 250, wherein the package identifier 250 interpreted from the bar code is used to activate the individual transaction cards secured by the package. Alternatively, the second step may be performed by reading an RFID tag or computer chip containing the package identifier 250, wherein the package identifier 250 interpreted from the RFID tag or computer chip is used to activate the individual transaction cards secured by the package. Upon being interpreted at the point of sale, the package identifier 250 may be conveyed (for example, via a computer network) to the multicard transaction computer 350 to effectuate activation or deactivation of the individual transaction cards secured by the package.

In a one-step activation sequence, the one step comprises simultaneously entering the combination vendor product identification and package identifier at the point of sale. For example, the one step may be performed at the point of sale by scanning a bar code, for example an EAN/UCC-128 bar code, containing both a vendor product identification portion and the package identifier portion. The vendor product identification portion may be used to perform a look-up to determine product identity and price as described previously. The package identifier portion may be used to activate or deactivate the individual transaction cards secured by the package such that the individual transaction cards may be used to transact business with redeeming merchants described previously. As can be seen from these descriptions, the one-step process only requires a single entry at the point of sale to activate or deactivate the package and individual transaction cards secured by the package, whereas the two-step process requires two separate steps to activate or deactivate the package and individual transaction cards secured by the package.

Figure 3:
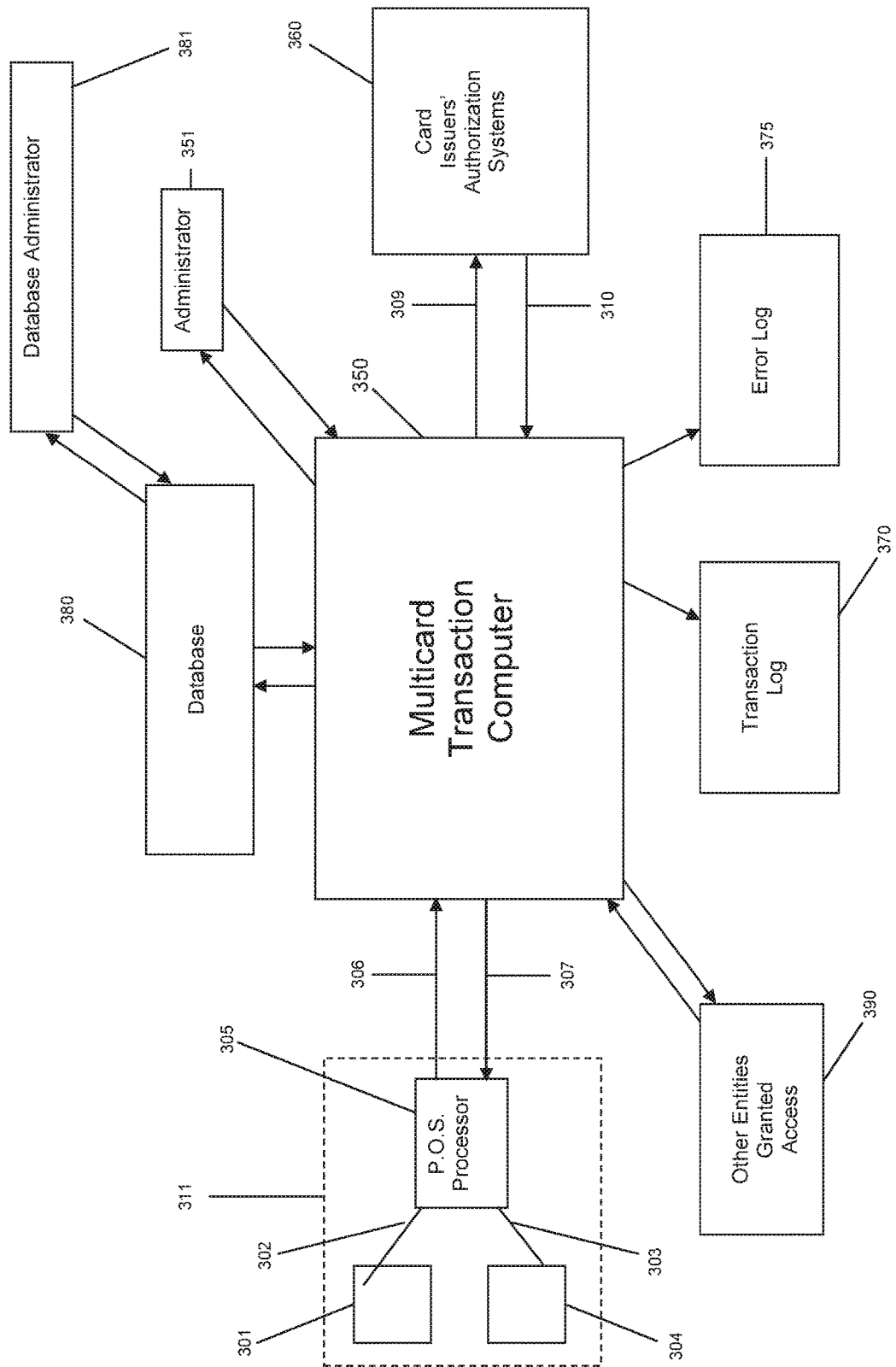
FIG. 3 is a schematic representation of the multicard transaction system.

At the time that the allocation of transaction cards 100, 101 to the packages 200 and 210 is determined, the allocation information is added to a database that correlates the data encoded in the transaction card identifiers allocated to a specific package 200 and 210, to the unique package identifier 250 of the package. Referring to FIG. 3, the database 380 of correlated package identifier and individual transaction card identifier information provides the basis for the latency of a transaction being independent of the number of individual transaction cards secured by a package subject to a request for activation or deactivation at a point of sale. This correlated information contained in the database 380 allows a card vendor, or other entity with access to the database 380, to initiate activation or deactivation of every card secured by the package by simply interpreting and communicating the package identifier 250 and such a request to the transaction activation computer 350.

The database can be fashioned in any form that is generally accepted in the industry. The database may contain information related to: (a) package identifiers 250; (b) individual transaction card identifiers 111; (c) the individual card issuers' accounts maintained for the individual transaction cards; (d) the monetary amount ascribed to packages; (d) the monetary amount ascribed to individual transaction cards; (e) the identities of the individual card issuers of the transaction cards secured by the packages and correlated to unique package identifiers; (f) the time the packages and individual transaction cards were correlated; (g) the PINs associated with individual transaction cards requiring PIN input for use; and (h) any other information the database administrator 381 determines should be maintained in the database 380.

In one embodiment, the correlation of the data encoded in the transaction card identifiers 111 to the specific package identifier 250 may be accomplished by a manual process whereby human action is required to record the unique package identifier 250 and the transaction card identifiers 111 secured in the package. In this embodiment, the transaction card identifiers 111 and package identifiers 250 are already present on the respective components. For example, human input could be utilized to physically interpret the package identifier 250 and transaction card identifiers 111 and to physically transcribe this correlative information. Alternatively, human input could be utilized to operate mechanical, electronic, or other types of devices to interpret the package identifier 250 and transaction card identifiers 111. Devices such as bar code readers and magnetic strip readers could be utilized depending on the package identifier's 250 and transaction card identifiers' 111 encoded forms. The information from the package identifier 250 and transaction card identifiers 111 could then be manually correlated, or correlated electronically. The correlative information could then be entered into the database 380 by the database administrator 381.

In another embodiment, the correlation of the data encoded in the transaction card identifiers to the specific package identifier 250 may be accomplished by an automated process whereby non-human means are utilized to record and correlate the unique package identifier 250 and the transaction card identifiers 111 secured by the package. In this embodiment, the transaction card identifiers 111 and package identifiers 250 are already present on the respective components. For example, mechanical, electronic or other non-human means could be utilized to interpret the package identifier 250 and transaction card identifiers 111. If the information is encoded in bar codes 255, a device capable of interpreting the bar codes (e.g., a bar code reader or scanner)

could be utilized to scan the package identifiers 250 and transaction card identifiers 111; if the information is encoded in magnetic strips 256, a device capable of interpreting magnetic strips (e.g., a magnetic strip reader or scanner) could be utilized to scan the package identifiers and the transaction card identifiers. The information from the package identifier 250 and transaction cards identifiers 111 could then be automatically electronically correlated. The correlative information could then be entered into the database 380 by the database administrator 381.

In a further embodiment, the correlation of the data encoded in the transaction card identifiers 111 to the specific package identifier 250 may be accomplished by an automated process whereby the package identifier 250 is generated and encoded onto the package in response to a process that allocated transaction cards to the package. A device configured to allocate transaction cards to packages, interpret transaction card identifiers and package identifiers, and record transaction card identifiers assigned to packages could be used to generate packages of transaction cards and to record the correlation of the package identifier 250 to the transaction cards secured by the package. This correlative information could then be entered into the database 380 by the database administrator 381.

For example, a manufacturing system could be employed to simultaneously fabricate individual transaction cards and package assemblies, assign unique transaction card identifiers 111 to the individual transaction cards 100, 101 and assign unique package identifiers 250 to the packages, collate the individual transaction cards 100, 101 into specific packages, record the individual transaction cards identifiers 111 of the individual transaction cards secured by the package and the package's unique package identifier 250, and transfer the recorded correlative information into the database 380.

In accordance with the present invention, a method of packaging multiple transaction cards for display and sale in an unsecured environment is provided. As has been discussed, the method comprises (a) providing a plurality of pre-formed transaction cards 100, 101, each transaction card bearing a unique transaction card identifier 111 and each transaction card identifier corresponding to a unique transaction card account maintained by the card issuer; (b) providing a means of packaging the plurality of transaction cards 101, 101, each package being adapted to secure a plurality of transaction cards, and each package comprising a unique package identifier 250 associated with the package 200 and 210 in a manner consistent with a desired method of interpreting the package identifier; and (c) providing and maintaining a database 380 that correlates the package identifiers 250 of the packages to the transaction card identifiers 111 of the transaction cards that are secured by the package 200 and 210.

To further describe the present invention, a card vendor may gain access to the database by accessing a secure multicard transaction system, as depicted in FIG. 3. The multicard transaction system comprises: (a) at least one point of sale component 311; (b) a multicard transaction computer 350; (c) a database 380 of package identifiers and individual transaction card identifiers; (d) at least one individual card issuer's authorization system 360; and (e) any other component included in the system by the multicard transaction computer administrator 351.

FIG. 3 illustrates a multicard transaction system 300 in accordance with the present invention. The system is adapted to respond to a plurality of packages 200 and 210, with each of the packages bearing unique identifiers 250. As can be seen in FIG. 3, at the point of sale, the package identifier is interpreted 302 by a point of sale interpretation component 301. The point of sale interpretation component 301 can comprise a human, a bar code scanner, magnetic strip reader, optical character recognition device, or other device configured to interpret the data encoded in the package identifier.

Contemporaneously with the interpretation of the package identifier 250, a request for activation or deactivation 303 by a point of sale transaction component 304 is made. The point of sale transaction component 304 can comprise a human, an electronic input device, a register, a computer processing unit ("CPU"), or other means of requesting the activation or deactivation of the package identifier interpreted by the point of sale interpretation component 301. For purposes of disclosure, the actions performed by the point of sale interpretation component 301 and the point of sale transaction component 304 may be performed by one component capable of performing both actions that would be performed by the individual components.

The point of sale interpretation component 301 and the point of sale transaction component 304 communicate with the point of sale processing component 305. The point of sale processing component 305 can comprise a CPU or other type of processing device accepted for use in the industry. The point of sale interpretation component 301 communicates the package identifier 250 to the point of sale processing component 305. The point of sale transaction component 304 communicates the request for activation or deactivation of the package identifier 250 interpreted by the point of sale interpretation component 301 to the point of sale processing component 305. The point of sale processing component 305 correlates the package identifier interpreted by the point of sale interpretation component 301 with the request for activation or deactivation made by the point of sale transaction component 304 and communicates the request 306 for activation or deactivation of the package identifier to the multicard transaction computer 350. For purposes of disclosure, the actions performed by the point of sale interpretation component 301, the point of sale transaction component 304, and the point of sale processing component 306 may all be performed by one component capable of performing all the actions that would be performed by the individual components.

The point of sale processing component 305 is connectable to the multicard transaction computer 350 as via a suitable network, such as the public switched telephone network (PSTN) or an independent dedicated network. Each point of sale processing component 305 has an associated identifier that may be transmitted to the multicard transaction computer 350 during the course of connecting the point of sale processing component 305 to the multicard transaction computer 350.

As depicted in FIG. 3, the multicard transaction computer 350 is configured to: (a) form a secure connection with the card vendor system 311, the card issuers' authorization systems 360, and any other entities authorized to access the multicard transaction computer 350 by the multicard transaction computer administrator 351; (b) access the database 380 to determine the transaction cards to be activated or deactivated based on the package identifier communicated to it by the card vendor; (c) to communicate with card issuers' authorization systems 360 to request and receive activation or deactivation of specific transaction cards based on the information contained in the database 380 correlating transaction card identifiers to unique package identifiers; (d) generate and maintain transaction log 370 of all activities performed; (e) generate and maintain an error log 375 of all activities unsuccessfully completed and reasons therefor; (f) communicate to the card vendor the activation or deactivation of the individual transaction cards secured by the package and any information concomitant with the activation or deactivation of individual transaction cards, i.e. the communication of PINs associated with activated transaction cards; and (g) communicate to the card vendor any reasons why requested transactions cannot not be completed.

Oversight and maintenance of the multicard transaction computer is performed by the multicard transaction computer administrator 351. Although not required, in an alternative embodiment, the multicard transaction computer administrator 351 may also function as the database administrator 381.

The multicard transaction computer 350 may comprise a singular processing unit, with concomitant storage capability, capable of accessing the database 380, creating and maintaining a transaction log 370, creating and maintaining an error log 375, communicating with the card vendor, communicating with the individual card issuers' authorization systems 360, processing individual transaction card activation and or deactivation requests, and communicating with other systems 390 capable of and authorized to communicate with the multicard transaction computer 350.

In the alternative, the multicard transaction computer may comprise a plurality of processing units, with concomitant storage capabilities, each capable of: accessing the database 380; creating a transaction log 370; creating and maintaining an error log 375; communicating with card vendors; communicating with the individual card issuers' authorization systems 360; processing individual transaction card activation and or deactivation requests; and communicating with other systems 390 capable of and authorized to communicate with the multicard transaction computer 350.

In another alternative embodiment, the multicard transaction computer 350 may comprise a plurality of processing units, with concomitant storage capabilities, each individually designated for: accessing the database 380; creating a transaction log 370; creating and maintaining an error log 375; communicating with card vendors; communicating with the individual card issuers' authorization systems 360; processing individual transaction card activation and or deactivation requests; and communicating with other systems 390 capable of and authorized to communicate with the multicard transaction computer 350.

In another alternative embodiment, the multicard transaction computer may comprise a plurality of processing units, with concomitant storage capabilities: capable of accessing the database 380, creating a transaction log 370, creating and maintaining an error log 375, communicating with card vendors, communicating with the individual card issuers' authorization systems 360, processing individual transaction card activation and or deactivation requests, and communicating with other systems 390 capable of and authorized to communicate with the multicard transaction computer 350; designated for accessing the database 380, designated for creating a transaction log 370, designated for creating and maintaining an error log 375, designated for communicating with card vendors, designated for communicating with the individual card issuers' authorization systems 360, designated for processing individual transaction card activation and or deactivation requests, and designated for communicating with other systems 390 capable of and authorized to communicate with the multicard transaction computer 350; or any combination thereof.

Upon receipt of an activation or deactivation request for a package of multiple transaction cards from the card vendor, the multicard transaction computer 350 accesses the database 380 of transaction card identifier data correlated to unique package identifiers. The multicard transaction computer 350 processes the information contained in the database 380 and communicates 309, 310 with the individual card issuers' authorization systems 360 to effectuate activation or deactivation of the transaction cards secured by the package. The multicard transaction computer's 350 communication with the individual card issuers' authorization systems 360 may occur simultaneously or independently. The multicard transaction computer 350 is connectable to the individual card issuers' authorization systems as via a suitable network, such as the PSTN or an independent dedicated network. The multicard transaction computer 350 is configured to receive communication from the card issuers' authorization systems 360 concerning the status of the activation or deactivation of individual transaction cards.

The multicard transaction computer 350 is also configured to generate and maintain a transaction log 370 of all activity involving the multicard activation computer 350. The transaction log may comprise a detailed summary of: (a) requested package activations; (b) requested package deactivations; (c) requested individual card activations; (d) requested individual card deactivations; (e) the monetary amount ascribed to package activations; (f) the monetary amount ascribed to package deactivations; (g) the monetary amounts ascribed individual transaction card activations; (h) the monetary amounts ascribed to individual transaction cards deactivations; (i) the identities of the individual card issuers of the transaction cards secured by activated packages; (j) the identities of the individual card issuers of the transaction cards secured by deactivated packages; (k) the time the packages were activated; (l) the time the packages were deactivated; (m) the time individual transaction cards were activated; (n) the time individual transaction cards were deactivated; (o) the transaction or communication performed with the card issuer to activate the individual transaction cards; (p) the transaction or communication performed with the card issuer to deactivate the individual transaction cards; (q) the PIN communicated to the card vendor in response to a request to activate a transaction card requiring the input of a PIN for use; (r) any other information the multicard transaction computer administrator 351 directs the multicard transaction computer 350 to maintain as a log entry; and (s) any combination thereof.

The information contained in the transaction log 370 may be used to generate reconciliation reports, settlement reports, payment reports, audit reports, or other forms of information aggregation for the benefit of, use by, or for provision to, the multicard transaction administrator 351, the database administrator 381, card vendors, card issuers, card issuer's authorization systems 360, redeeming merchants, or other interested parties.

The multicard transaction computer 350 is configured to generate and maintain an error log of all transactions that were not completed and reasons therefor.

The multicard transaction computer 350 is also configured to communicate to the card vendor 307 the status of a request for activation or deactivation of a package identifier 250 and/or individual transaction cards and to communicate any necessary PIN information required by activated transaction cards to the card vendor in order for the card purchaser to be apprised of that information for use of the purchased individual transaction card. As previously discussed, is connectable to the individual card issuers' authorization systems as via a suitable network, such as the PSTN or an independent dedicated network.

The multicard transaction computer 350 is also configured to communicate with other entities 390 authorized to access the multicard transaction system and specifically authorized to access the multicard transaction computer 350. These other entities may comprise third party payment management systems, third party audit systems, card issuer affiliated entities, card vendor affiliated entities, redeeming merchants or redeeming merchant affiliated entities, or any other entity provided access by the multicard transaction computer administrator 351.

There may arise situations where an activation or deactivation request is received by the multicard transaction computer 350, but the information in the database 380 pertaining to the package identifier or the individual transaction card identifiers received by multicard activation computer 350 precludes completion of the request. For example, a package assembly may have been previously activated, returned to the point of sale for a refund, but not deactivated prior to reshelving. In that case, when a subsequent customer purchases that package assembly, and an activation request is communicated to the multicard transaction computer 350, the database 380 file accessed by the multicard transaction computer 350 will indicate that the package assembly and the individual transaction cards secured by the package are already activated. In this and other similar situations, the multicard transaction computer will communicate a message to the card vendor that the transaction cannot be completed.

Figure 4:
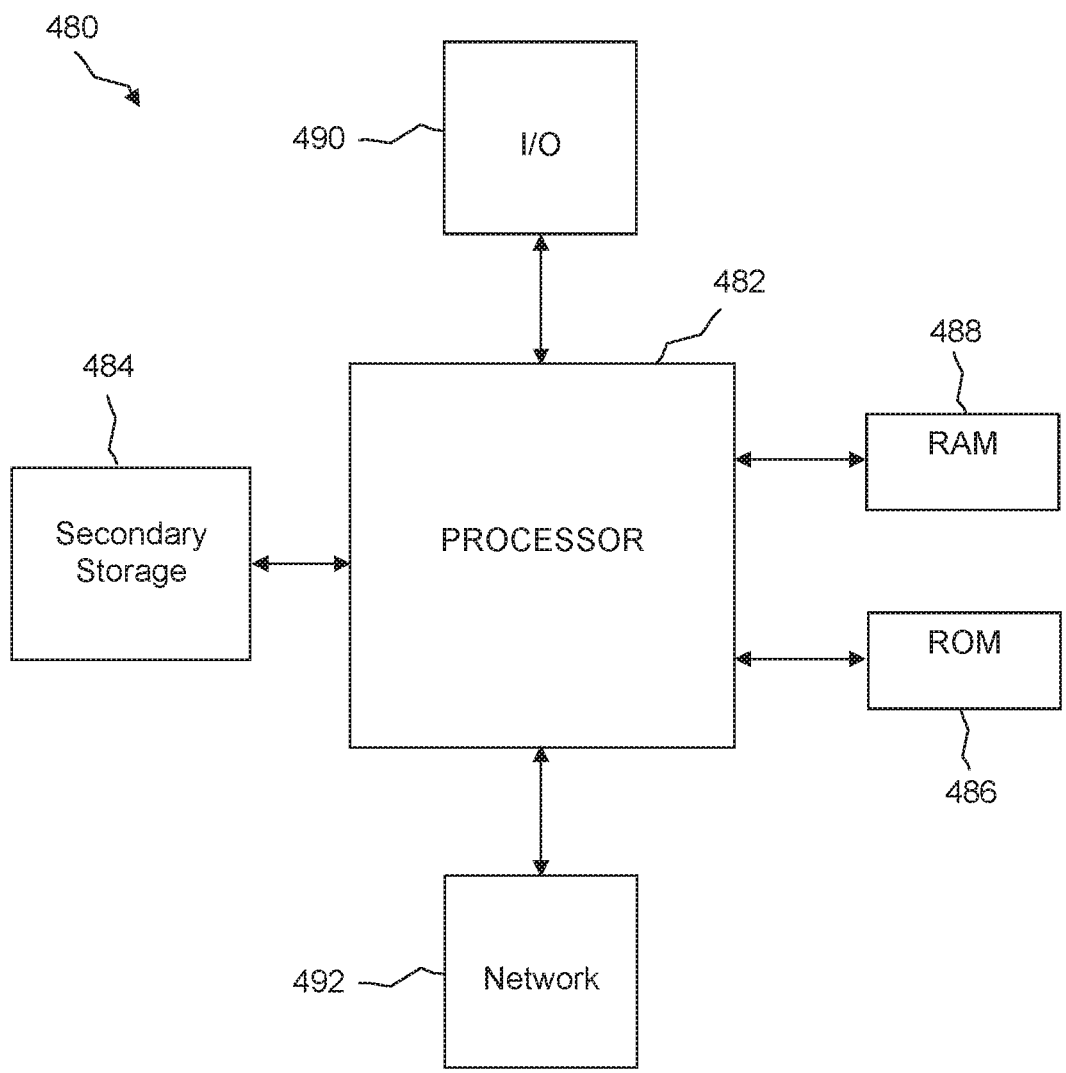
FIG. 4 illustrates an exemplary general purpose computer system suitable for implementing the several embodiments of the disclosure.

The multicard transaction computer 350 above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 480 includes a processor 482 (which may be referred to as a central processor unit or CPU) that is in communication with memory devices including secondary storage 484, read only memory (ROM) 486, random access memory (RAM) 488, input/output (I/O) 490 devices, and network connectivity devices 492. The processor may be implemented as one or more CPU chips.

The secondary storage 484 is typically comprised of one or more disk drives or tape drives and is used for non-volatile storage of data and as an over-flow data storage device if RAM 388 is not large enough to hold all working data. Secondary storage 484 may be used to store programs which are loaded into RAM 388 when such programs are selected for execution. The ROM 486 is used to store instructions and perhaps data which are read during program execution. ROM 486 is a non-volatile memory device which typically has a small memory capacity relative to the larger memory capacity of secondary storage. The RAM 488 is used to store volatile data and perhaps to store instructions. Access to both ROM 486 and RAM 488 is typically faster than to secondary storage 484.

I/O 490 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 492 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 492 devices may enable the processor 482 to communicate with an Internet or one or more intranets. With such a network connection, it is contemplated that the processor 482 might receive information from the network, or might output information to the network in the course of performing the above-described method steps. Such information, which is often represented as a sequence of instructions to be executed using processor 482, may be received from and outputted to the network, for example, in the form of a computer data signal embodied in a carrier wave.

Such information, which may include data or instructions to be executed using processor 482 for example, may be received from and outputted to the network, for example, in the form of a computer data baseband signal or signal embodied in a carrier wave. The baseband signal or signal embodied in the carrier wave generated by the network connectivity 492 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 482 executes instructions, codes, computer programs, scripts which it accesses from hard disk, floppy disk, optical disk (these various disk based systems may all be considered secondary storage 484), ROM 486, RAM 488, or the network connectivity devices 492.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

There has been described herein a multicard transaction system that allows users to activate or deactivate multiple transaction cards by merely requesting the activation or deactivation of a single package identifier assigned to a package securing a plurality of individual transaction cards of independent, non-affiliated card issuers. It will be apparent to those skilled in the art that modifications may be made without departing from the spirit and scope of the invention. The embodiments described are representative only, and are not intended to be limiting. Many variations, combinations, and modifications of the applications disclosed herein are possible and are within the scope of the invention. Accordingly, the scope of protection is not limited by the description set out above, but is defined by the claims which follow, that scope including all equivalents of the subject matter of the claims.

What is claimed is:

1. A package assembly for processing a plurality of transaction cards at a point of sale comprising:
    at least two transaction cards, each with a unique account identifier associated with a unique account;
    a package for securing the plurality of transaction cards, wherein the package comprises at least three distinct identifiers present and accessible on the package assembly, wherein the at least three distinct identifiers comprise a unique package identifier, a vendor product identification code identifier, and an identifier which is a combination of the unique package identifier and the vendor product identification code identifier, and wherein the unique package identifier and the combination of the unique package identifier and the vendor product identification code identifier are interpretable at the point of sale to activate the at least two transaction cards.

2. The package assembly of claim 1, wherein the package further comprises transaction cards issued by a singular card issuer.

3. The package assembly of claim 1, wherein the package further comprises transaction cards issued by a plurality of card issuers.

4. The package assembly of claim 1, wherein the package further comprises transaction cards issued by affiliated issuers.

5. The package assembly of claim 1, wherein the package further comprises transaction cards issued by non-affiliated issuers.

6. The package assembly of claim 1, wherein the package further comprises an identifier that is interpretable by a point of sale component.

7. The package assembly of claim 1, wherein the at least three distinct identifiers comprise bar codes, magnetic strips, series of numerals, series of letters, series of symbols, or combinations thereof.

* * * * *